Jan. 9, 1951

C. F. ZOBEL ET AL 2,537,925

DAYLIGHT-LOADING DEVELOPING TANK

Filed Dec. 30, 1947

CARL F. ZOBEL
ARTHUR B. FOX
INVENTORS

BY Frank R. Gollon
ATTORNEYS

Patented Jan. 9, 1951

2,537,925

UNITED STATES PATENT OFFICE 2,537,925

DAYLIGHT-LOADING DEVELOPING TANK

Carl F. Zobel and Arthur B. Fox, Rochester, N. Y., assignors to Eastman Kodak Company, Rochester, N. Y., a corporation of New Jersey Application December 30, 1947, Serial No. 794,568

13 Claims. (Cl. 95—90.5)

The present invention relates to a processing device for photographic film and more particularly to a daylight-loading developing tank especially adapted for roll film and for amateur use.

There are numerous varieties of daylight-loading developing tanks for roll film in extensive use by amateur photographers who process their own film. These devices fall roughly into two classes: those in which the film is wound back and forth between a supply and a takeup spool mounted in a tank, and those in which the film is unwound from the supply spool, mounted in the tank, through a series of guides which retain the adjacent film surfaces in spaced relation with each other whereby the processing fluid may be circulated between and contact the whole of the exposed picture areas. The present invention is directed to the latter type of developing tank. In tanks of this type the guide means are often complex arrangements of partitions, ribs, projections, etc. which retain the film in a series of convolutions. These often offer considerable resistance to the passage of the film therebetween and sometimes result in the binding of the film therein before the whole of the roll has been unwound. If unknown to the operator, this condition, of course, results in incomplete development. Then too, there is always the possibility of damage to the film caused by the operator's attempting to forcibly unwind the film against the resistance offered by the guide means to the passage of the film. Another inadequacy of prior art devices of this type has been the fact that in most of these no means are provided to positively limit the rotation of the film spool to the amount necessary to unwind all of the film from the spool with the result that the film spool is often overwound causing damage to the film. Our invention is intended to remedy the above shortcomings of prior art devices by the provision of a device in which the guide means is exceedingly simple and offers the least possible resistance to the movement of the film as it is unwound from the spool and by the provision therein of means which limits the rotation of the film spool to the number of revolutions required to unwind all of the film from the spool.

It is, therefore, an object of this invention to provide an improved processing device for roll film.

It is a further object of this invention to provide an improved daylight-loading developing tank for roll film in which the film is unwound from a supply spool into the tank to assume a predetermined configuration therein.

It is a still further object of this invention to provide a daylight-loading processing tank of the character described in which is provided improved guide means which offers a minimum of resistance to the unwinding of the film.

It is a still further object of this invention to provide an improved daylight-loading processing tank of the character described in which the rotation of film spool is restricted to the number of revolutions necessary to unwind substantially the whole of the film from the film spool.

It is a still further object of this invention to provide a daylight-loading developing tank which is simple in construction, relatively inexpensive, and efficient of operation.

Other objects and advantages of the invention will become apparent from the following description taken in connection with the accompanying drawing, and it will be understood that many changes may be made in the details of construction and arrangement of parts shown and described without departing from the spirit of the invention as expressed in the accompanying claims. We, therefore, do not wish to be limited to the exact details shown and described as the preferred form only has been shown by way of illustration.

Figure 3:
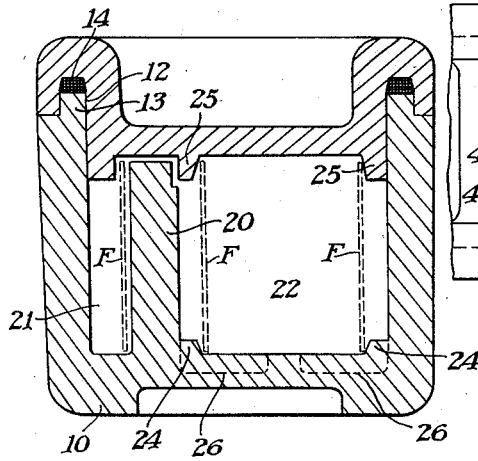
Fig. 3 is an enlarged section taken on the line 3—3 of Fig. 2.
Figure 4:
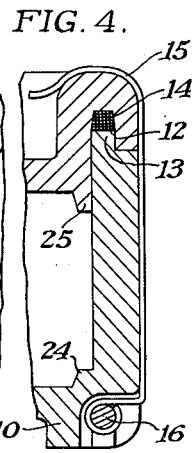
Fig. 4 is an enlarged section taken on the line 4—4 of Fig. 2.

The daylight-loading developing tank embodying this invention includes the elongated tank 10 and the cover 11 which has a light-tight and fluid-tight fit with the edge of the tank. This fit is secured by the provision of a recess 12 in the edge of the cover 11, adapted to receive the projecting rib 13 integrally formed on the edge of the tank 10. To ensure the fluid-tightness of the joint a strip of sealing material 14, such as rubber, is provided in the recess, as illustrated in Figs. 3 and 4. Spring clamps 15, rotatably mounted about pivots 16 mounted along the bottom edge of the tank, permit the tight closure of the tank.

Figure 1:
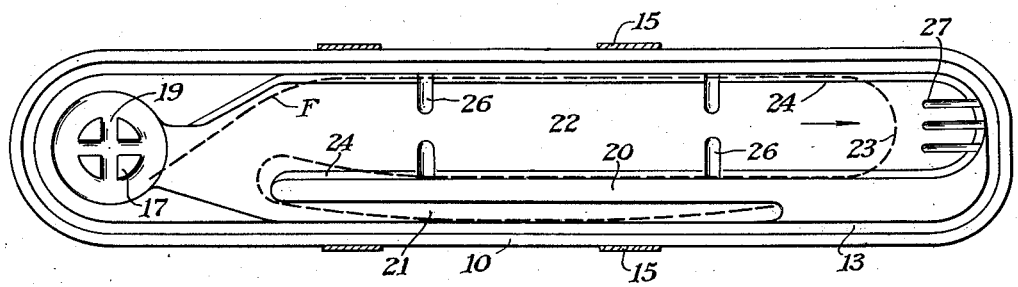
Fig. 1 is plan view of a developing tank, with cover removed, embodying the present invention.

In one end of the tank is provided a bearing stud 17 upon which may be mounted for rotation a film spool 18. The bearing has several passageways 19 cut therein, as illustrated in Fig. 1, for a purpose which will be later apparent. A partition 20, integrally formed with and extending from the other end of the tank, divides it into the two chambers 21 and 22, the former of which is relatively narrow and the latter relatively wider to accommodate a film loop. The length of chamber 21 is just less than the length of the film leader on the spool with which the tank is intended to be used. The length of the wider chamber 22 is such that it will receive the remainder of the film upon the film spool 18 in the form of a single loop 23 as shown by the dashed line in Fig. 1. This assures that the exposed emulsion-coated portion of the film will be entirely received in the wider chamber to preclude the possibility of the emulsion being scratched, as will be later understood.

The wider chamber 22 is provided with two vertically spaced projections extending thereabout. The lower projection 24 is integrally formed with the tank body, the upper projection 25 with the cover 11. These projections serve as guide means to engage only the edges of the film F, whereby the picture areas are retained in spaced relation with the wall of the chamber 22, as noted in Fig. 3. This prevents abrading of the emulsion layer against the wall of the chamber and also allows the developing solution to readily come in contact with that layer. To facilitate the processing solution's flowing from the main body of the chamber into the space defined by the wall of the chamber 22, the film and the projections 24 and 25, the projection 24 is undercut along the sides and at the end of the chamber to form the passages 26 and 27.

Figure 2:
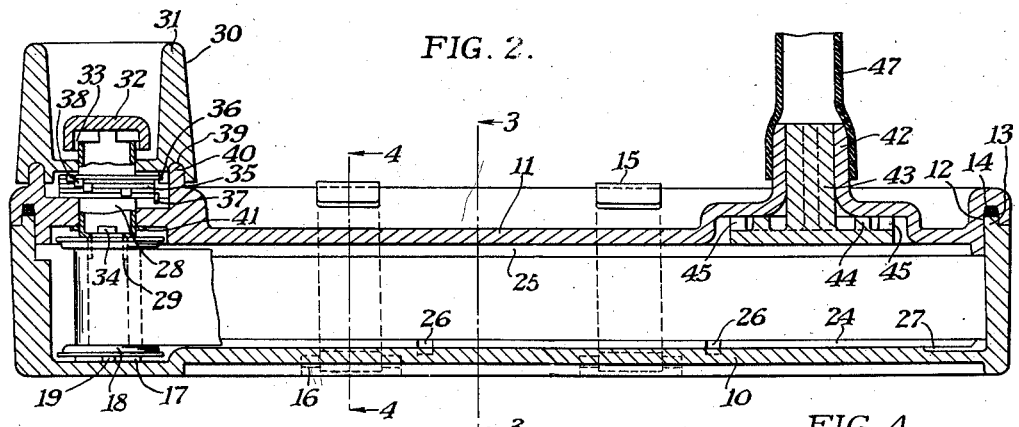
Fig. 2 is a sectional elevational view of the tank of Fig. 1 with the cover fitted thereon.

The film spool 18 is rotated by the hollow winding spindle 28 which is journalled in the cover 11 and which has spool-engaging means 29 at one end thereof and a cup-shaped winding knob 30 at the other, as noted in Fig. 2. The cup-shaped winding knob includes the funnel-like element 31 into which the processing fluid may be poured and the baffle 32 to make the fluid opening into the tank light-tight. Passages 33 between the baffle and the hollow winding spindle permit the fluid to pass from the funnel-like element 31 through the hollow spindle and into the tank through the openings 34 and the passageways 19. The winding knob 30 has an annular recess 39 therein which receives the annular rib 40 on the cover 11 for rotation thereon. A washer 41 holds the winding spindle against endwise displacement with respect to the cover.

To restrict the rotation of the winding spindle 28 to the number of revolutions required to unwind substantially the entire film from the film spool, a series of washers 35 is provided on the spindle. The top washer is locked against rotation upon the winding spindle by means of the projection 36 thereon which engages in a recess in the winding knob. The bottom washer has an offset, downwardly-extending projection 37 engaging in a recess in the cover 11 which locks it against rotation relative to the cover, yet permits relative rotation between it and the spindle 28. The intermediate washers are all rotatably mounted on the shaft. Each of said washers 35 above the bottom washer has an offset, downwardly-extending lug or projection 38, similar to the projection 37 on the bottom washer. Each of the lugs 38 extend downwardly less than the thickness of the underlying washer and is intended to limit the relative rotation between the washer from which it projects and the washer immediately below to not quite one revolution. This it does by abutting against the projecting lug on the washer below. Thus, it is apparent that rotation of the spindle relative to the cover 11 is possible only until each of the lugs 38 abut against the lug of the underlying washer after which the winding spindle is locked against further rotation. By employing a suitable number of such washers the winding mechanism of the present invention may be designed for use with a particular film spool requiring a specific number of turns to unwind the whole of the film.

Figure 5:
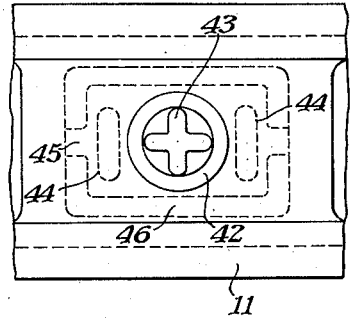
Fig. 5 is an enlarged plan view of a portion of the closed tank, illustrating the light-tight opening therein for admitting fluid to the tank.

A second light-tight opening into the tank is provided whereby the processing fluid or wash water may be circulated through the tank. This opening consists of the tube connection 42 down the center of which extends a star-shaped core 43. Fluid passing through the passages between the core 43 and tube 42 passes around the baffles 44 and through the openings 45 in the wall 46 and into the tank. This arrangement of fluid passages, baffles, etc. is best seen in Fig. 5. The tube connection 42 may be connected with an external source of fluid by means of a rubber hose 47.

In operation, a short length of the leader end of the film is unwound from the spool and the spool inserted in the tank so that the bearing stud 17 is received in the opening in the spool end and the unwound film started in the narrow chamber 21. A marking can be provided on the partition 20 to indicate the length of film which is to be initially unwound. With the winding spindle turned clockwise (as viewed from above in Fig. 2) as far as it will go, the cover is placed on the tank and the spindle rotated slightly in order that the spool-engaging means 29 may mesh with the spool. The cover is now clamped in place by means of the spring clamps 15 and the winding spindle rotated counterclockwise until the spindle is locked against further rotation. This operation will drive the film leader to the end of chamber 21 whereupon the film will fold upon itself entering chamber 22 in the direction indicated by the arrow in Fig. 1. Chamber 22 may be just slightly longer than necessary to receive the remainder of the film on the film spool therein to provide some small tolerance. In addition, the means restricting rotation of the winding spindle may be designed to permit a fraction of a rotation (less than a half revolution) more than is ordinarily necessary to unwind all of the film from the spool. Such a tolerance will compensate for the small degree of rotation of the spindle which may be necessary to mesh it with the film spool, while any overwinding caused thereby will not be substantial nor injurious to the film. This, however, is not ordinarily necessary, inasmuch as only a small fraction of a rotation will mesh the spindle with the spool and the very small portion of film which, because of this, may not be unwound would not include any of the exposed picture area anyway. Since the length of the chamber 21 is just less than the length of the film leader, as above noted, no part of the exposed picture area will be received in the narrow chamber, thus precluding the possibility of abrading the emulsion in the narrower chamber.

The film being now positioned in the tank, developing fluid is admitted through the funnel-like element 31 and hollow spindle 28. After development has been completed, the developer may be poured off and wash water circulated through the tank by admitting it through the hose 47 and tube connection 42 and allowing it to overflow through the hollow spindle and funnel-like element. After this, a fixing solution may be admitted to the tank through the funnel and spindle and, after draining this, the washing may again be repeated.

It is obvious that only one light-tight fluid opening may be employed in a tank embodying the present invention. It is also obvious that, while the rotation-restricting means on the winding spindle is a highly desirable feature of this invention, a useful and novel developing tank may be constructed omitting this particular feature. The various components of the above-described developing tank may be constructed of stainless steel, plastic or any material not adversely affected by the chemicals employed in the various processing operations.

From the foregoing description it will be apparent that we have provided means for obtaining all the objects and advantageous of this invention.

What we claim and desire to secure by Letters Patent of the United States is:

1. A daylight-loading processing tank for roll film comprising an elongated tank, a light-tight cover for said tank, means for rotatably mounting a film spool at one end of the tank, a partition extending lengthwise from the other end of the tank dividing it into two chambers opening adjacent to the spool-mounting means and closed at said other end, one of said chambers being narrow and of a length to receive no more than the leader on the film, and the other chamber being relatively wider and of a length sufficient to receive the remainder of the film on the film spool in the form of a film loop, and rotatable means external of the cover adapted to engage said film spool.

2. A daylight-loading processing tank for roll film comprising an elongated tank, a light-tight cover for said tank, means for rotatably mounting a film spool at one end of the tank, a partition extending lengthwise of the tank dividing it into two chambers opening at one end adjacent to the spool-mounting means, one of said chambers being narrow and closed at the other end the other chamber being relatively wider to accommodate a film loop, vertically spaced projections in said relatively wider chamber adapted to engage the edges of the film to preclude contact of the picture areas of the film with the wall of the chamber, and rotatable means mounted on the cover adapted to engage the film spool.

3. A daylight-loading processing tank for roll film comprising an elongated tank, a light-tight cover for said tank, means for rotatably mounting a film spool at one end of the tank, a partition extending lengthwise of the tank dividing it into two chambers closed at the other end of the tank and opening adjacent to the spool-mounting means, one of said chambers being narrow and the other being relatively wider to receive a film loop, a winding spindle extending externally of the cover and adapted to engage the film spool, and means on said winding spindle restricting the rotation thereof to a predetermined number of revolutions, whereby the film spool is rotatable to a degree just sufficient to unwind substantially the entire film from the spool.

4. A daylight-loading processing tank for roll film comprising an elongated tank, a light-tight cover for said tank, means for rotatably mounting a film spool at one end of the tank, a partition extending lengthwise from the other end of the tank dividing it into two chambers closed at said other end and opening adjacent to the spool-mounting means, one of said chambers being narrow and of a length to receive no more than the leader on the film, and the other chamber being relatively wider and of a length sufficient to receive the remainder of the film on the film spool in the form of a film loop, a winding spindle extending externally of the cover and adapted to engage the film spool, and means on said winding spindle restricting the rotation thereof to a predetermined number of revolutions whereby the film spool is rotatable to a degree just sufficient to unwind substantially the entire film from the spool.

5. A daylight-loading processing tank for roll film comprising an elongated tank, a cover for said tank having a light-tight and fluid-tight fitting with the edge of the tank, means for mounting a film spool at one end of the tank, a partition integral with and extending lengthwise from the other end of the tank dividing it into two chambers an end of each of which opens adjacent to the spool-mounting means, one of said chambers being narrow and closed at its other end and the other chamber being relatively wider to accommodate a film loop, and a rotatable, hollow spindle extending through the cover having spool-engaging means at one end and a cup-shaped winding knob at the other end, the cup-shaped knob and hollow spindle being adapted to provide a light-tight opening for admitting fluid to the tank.

6. A daylight-loading processing tank for roll film comprising an elongated tank, a cover for said tank having a light-tight and fluid-tight fitting with the edge of the tank, clamping means for locking said cover on said tank, means for rotatably mounting a film spool at one end of the tank, a partition extending lengthwise from the other end of the tank dividing it into two chambers opening at one end adjacent to the spool-mounting means, one of said chambers being narrow and closed at its other end and the other chamber being relatively wider to accommodate a film loop, vertically spaced projections in said relatively wider chamber extending the length thereof along each wall, adapted to engage the edges of the film to preclude contact of the picture areas of the film with the wall of the chamber, rotatable means external of the cover adapted to engage said film spool, and two light-tight openings in said cover whereby fluid may be admitted and circulated through said tank.

7. A daylight-loading processing tank for roll film comprising an elongated tank, a cover for said tank having a light-tight and fluid-tight fitting with the edge of the tank, means for rotatably mounting a film spool at one end of the tank, a partition integral with and extending lengthwise from the other end of the tank dividing it into two chambers closed at said other end and opening adjacent to the spool-mounting means, one of said chambers being narrow and the other being relatively wider to accommodate a film loop, vertically spaced projections in said relatively wider chamber adapted to engage the edges of the film to preclude contact of the picture areas of the film with the wall of the chamber, a rotatable, hollow spindle extending through the cover having spool-engaging means at one end and a cup-shaped winding knob at the other end, the cup-shaped knob and hollow spindle being adapted to provide a light-tight fluid opening into the tank, and a second light-tight fluid opening in said cover, whereby fluid may be admitted and circulated through said tank.

8. A daylight-loading processing tank for roll film comprising a tank, a light-tight cover for said tank, means for rotatably mounting a film spool in the tank, a winding spindle journalled in said cover and having film spool-engaging means at one end and a hand-engageable element at the other end, means on said winding spindle restricting the rotation thereof to a predetermined number of revolutions, said means comprising a series of superposed washers mounted on said spindle, one of said washers being secured against rotation of the spindle, another being rotatably mounted on the spindle and having means thereon locking it against rotation with respect to said cover, and the remaining washers rotatably mounted on the spindle intermediate said other two washers, each pair of adjacent washers having means thereon which restrict relative rotation between the two to a predetermined degree not exceeding one revolution, and film guide means in said tank adapted to receive the film unwound from said film spool.

9. A daylight-loading processing tank for roll film comprising an elongated tank, a light-tight cover for said tank, means for rotatably mounting a film spool at one end of the tank, a partition extending lengthwise from the other end of the tank dividing it into two chambers, an end of each of which opens adjacent to the spool-mounting means, one of said chambers being narrow and closed at its other end and the other being relatively wider to receive a film loop, a winding spindle journalled in said cover and having spool-engaging means at one end, and means on said winding spindle restricting the rotation thereof to a predetermined number of revolutions, said means comprising a series of superposed washers mounted on said spindle, one of said washers being secured against rotation on the spindle, another being rotatably mounted on the spindle and having means thereon locking it against rotation with respect to said cover, and the remaining washers rotatably mounted on the spindle intermediate said other two washers, each pair of adjacent washers having means thereon which restrict relative rotation between the two to a predetermined degree not exceeding one revolution.

10. A daylight-loading processing tank for roll film comprising an elongated tank, a cover for said tank having a light-tight and fluid-tight fitting with the edge of the tank, means for rotatably mounting a film spool at one end of the tank, a partition extending lengthwise from the other end of the tank dividing it into two chambers closed at said other end and opening adjacent to the spool-mounting means, one of said chambers being narrow and the other being relatively wider to accommodate a film loop, a hollow winding spindle journalled in said cover and having spool-engaging means at one end and a cup-shaped winding knob at the other end, the cup-shaped knob and hollow spindle being adapted to provide a light-tight fluid opening into the tank, a second light-tight fluid opening in said cover, whereby fluid may be admitted and circulated through said tank, and means on said winding spindle restricting the rotation thereof to a predetermined number of revolutions whereby the film spool is rotatable to a degree sufficient to unwind substantially the entire film from the spool without substantial overwinding.

11. A daylight-loading processing tank for roll film comprising a tank, a cover for said tank having a light-tight and fluid-tight fitting with the edge of the tank, means for rotatably mounting a film spool at one end of the tank, a partition extending lengthwise from the other end of the tank dividing it into two chambers opening at one end adjacent to the spool-mounting means, one of said chambers being narrow and closed at the other end and of a length to receive no more than the leader on the film, and the other chamber being relatively wider and of a length sufficient to receive the remainder of the film on the film spool in the form of a film loop, a hollow winding spindle journalled in said cover and having spool-engaging means at one end and a cup-shaped winding knob at the other end, the cup-shaped knob and hollow spindle being adapted to provide a light-tight opening for admitting fluid to said tank, and means on said winding spindle restricting the rotation thereof to a predetermined number of revolutions whereby the film spool is rotatable to a degree sufficient to unwind substantially the entire film from the spool without substantial overwinding, said latter means comprising a series of superposed washers mounted on said spindle, one of said washers being secured against rotation on the spindle, another being rotatably mounted on the spindle and having means thereon locking it against rotation with respect to said cover, and the remaining washers rotatably mounted on the spindle intermediate said other two washers, each pair of adjacent washers having means thereon which restrict relative rotation between the two to a predetermined degree not exceeding one revolution.

12. A daylight-loading processing tank for roll film comprising a tank, a cover for said tank having a light-tight and fluid-tight fitting with the edge of the tank, means for rotatably mounting a film spool at one end of the tank, a partition extending lengthwise from the other end of the tank dividing it into two chambers opening at one end adjacent to the spool-mounting means, one of said chambers being narrow and closed at the other end and of a length to receive no more than the leader on the film, and the other chamber being relatively wider and of a length sufficient to receive the remainder of the film on the film spool in the form of a film loop, vertically spaced projections extending about said relatively wider chamber adapted to engage the edges of the film to preclude contact of the picture areas of the film with the wall of the chamber, one of said projections being undercut to provide fluid passages between the main body of the wider chamber and the portions included between the spaced projections, a winding spindle journalled in said cover and having spool engaging means at one end, means on said winding spindle restricting the rotation thereof to a predetermined number of revolutions whereby the film spool is rotatable to a degree sufficient to unwind substantially the entire film from the spool without substantial overwinding, and a light-tight opening in said cover for admitting fluid to said tank.

13. A daylight-loading processing tank for roll film comprising a tank, a cover for said tank having a light-tight and fluid-tight fitting with the edge of the tank, means for rotatably mounting a film spool at one end of the tank, a partition extending lengthwise from the other end of the tank dividing it into two chambers opening adjacent to the spool-mounting means, one of said chambers being narrow and of a length to receive no more than the leader on the film, and the other chamber being relatively wider and of a length sufficient to receive the remainder of the film on the film spool in the form of a film loop, vertically spaced projections in said relatively wider chamber adapted to engage the edges of the film to preclude contact of the picture areas of the film with the wall of the chamber, a hollow winding spindle journalled in said cover and having spool engaging means at one end and a cup-shaped winding knob at the other end, the cup-shaped knob and hollow spindle being adapted to provide a light-tight fluid opening into the tank, and a second light-tight fluid opening in said cover, whereby fluid may be admitted and circulated through said tank, and means on said winding spindle restricting the rotation thereof to a predetermined number of revolutions, said means comprising a series of superposed washers mounted on said spindle, one of said washers being secured against rotation on the spindle, another being rotatably mounted on the spindle and having means thereon locking it against rotation with respect to said cover, and the remaining washers rotatably mounted on the spindle intermediate said other two washers, each pair of adjacent washers having means thereon which restrict relative rotation between the two to a predetermined degree not exceeding one revolution.

CARL F. ZOBEL.
ARTHUR B. FOX.

REFERENCES CITED

The following references are of record in the file of this patent:

UNITED STATES PATENTS

| Number | Name | Date |
|---|---|---|
| 907,942 | Zierath | Dec. 29, 1908 |
| 1,002,946 | Victorius | Sept. 12, 1911 |
| 1,245,848 | Winsolw | Nov. 6, 1917 |
| 1,956,938 | Wood et al. | May 1, 1934 |

FOREIGN PATENTS

| Number | Country | Date |
|---|---|---|
| 295,605 | Germany | Dec. 8, 1916 |
| 184,753 | Great Britain | Aug. 22, 1922 |